United States Patent
Park

(10) Patent No.: US 12,039,849 B2
(45) Date of Patent: Jul. 16, 2024

(54) BUILDING MONITORING SYSTEM FOR SENSING FIRE ON EVERY FIRE COMPARTMENT IN REAL TIME BY USING SENSOR ATTACHED TO EDGE OF HOLE OF FIRE WALL

(71) Applicant: Ki Tae Park, Pyeongtaek-si (KR)

(72) Inventor: Ki Tae Park, Pyeongtaek-si (KR)

(73) Assignee: Ki Tae Park, Pyeongtaek-si (KR)

( * ) Notice: Subject to any disclaimer, the term of this patent is extended or adjusted under 35 U.S.C. 154(b) by 0 days.

(21) Appl. No.: 17/613,076

(22) PCT Filed: May 25, 2021

(86) PCT No.: PCT/KR2021/006494
§ 371 (c)(1),
(2) Date: Nov. 21, 2021

(87) PCT Pub. No.: WO2022/030735
PCT Pub. Date: Feb. 10, 2022

(65) Prior Publication Data
US 2023/0154303 A1 May 18, 2023

(30) Foreign Application Priority Data

Aug. 7, 2020 (KR) .................. 10-2020-0098898
Oct. 15, 2020 (KR) .................. 10-2020-0133201

(51) Int. Cl.
*G08B 17/107* (2006.01)
*G01N 21/59* (2006.01)

(52) U.S. Cl.
CPC .......... *G08B 17/107* (2013.01); *G01N 21/59* (2013.01)

(58) Field of Classification Search
CPC .............................. G08B 17/107; G01N 21/59
See application file for complete search history.

(56) References Cited

U.S. PATENT DOCUMENTS

| | | | | |
|---|---|---|---|---|
| 4,768,024 A * | 8/1988 | Hauff | ...................... | H02G 3/22 174/152 G |
| 5,896,082 A * | 4/1999 | MacFarlane | .......... | G08B 29/188 340/521 |
| 6,057,549 A * | 5/2000 | Castleman | ............. | G08B 29/22 250/339.14 |
| 6,064,064 A * | 5/2000 | Castleman | ............. | G08B 29/24 250/339.05 |
| 6,078,050 A * | 6/2000 | Castleman | ........... | G08B 25/002 250/342 |
| 6,153,881 A * | 11/2000 | Castleman | ............. | G08B 17/12 250/339.14 |

(Continued)

*Primary Examiner* — Hoi C Lau

(57) ABSTRACT

The present invention discloses a fire-resistant sealing unit installed adjacent to a penetration part penetrating a partition wall inside a building, and filling the penetration part with fire-resistant sealing by heat generated in case of a fire in the building; a fire sensing unit installed adjacent to a fire-resistant sealing unit to detect whether a fire has occurred in a compartment area; and a control server that divides the inside of the building into predetermined conceptualized compartments, manages them as conceptualized compartmental areas, detects fire occurrence information from a fire sensing unit for each compartmental area, and calculates fire vector information.

10 Claims, 11 Drawing Sheets

(56) References Cited

U.S. PATENT DOCUMENTS

| | | | |
|---|---|---|---|
| 6,239,435 B1* | 5/2001 | Castleman | G08B 29/24 340/578 |
| 6,515,283 B1* | 2/2003 | Castleman | G08B 17/12 340/578 |
| 6,518,574 B1* | 2/2003 | Castleman | G08B 29/24 250/339.05 |
| 2002/0011570 A1* | 1/2002 | Castleman | G08B 17/12 250/339.04 |
| 2015/0135596 A1* | 5/2015 | Cooper | E05D 15/165 49/423 |
| 2023/0154303 A1* | 5/2023 | Park | G08B 17/107 356/438 |

* cited by examiner

BUILDING MONITORING SYSTEM FOR SENSING FIRE ON EVERY FIRE COMPARTMENT IN REAL TIME BY USING SENSOR ATTACHED TO EDGE OF HOLE OF FIRE WALL

TECHNICAL FIELD

The present invention relates to a building monitoring system capable of real-time fire detection for each fire compartment. More particularly, by using a sensor installed in the vicinity of parts charged in a penetration part of a fire wall, the system detects whether a fire has occurred and whether a fire exists in each fire compartment of the entire building in real time.

BACKGROUND

According to the analysis data of fire statistics and safety inspections in special buildings, as of the end of last year, the number of fires in 45,693 special buildings nationwide was 2,444, and the fire rate was 5.35%, a slight decrease from 5.63% in the previous year.

A special building is a medium-to-large building in which multiple people enter or reside, such as medical facilities with a total floor area of 3000 m or more, accommodation facilities such as hotels, academies and multi-use facilities of 2,000 m or more, apartment houses with 16 floors or more, and buildings with 11 floors or more. In accordance with the Fire Insurance Act, safety inspections are required every year, and fire insurance must also be purchased.

There were 140 fires that resulted in casualties, 17 killed and 311 injured. This is a significant decrease compared to the number of casualties, including 447 people in the previous year, 68 deaths and 379 injuries.

Property damage was 202.9 billion won, a sharp increase from about 73.7 billion won in 2018.

There are some technical attempts to detect and monitor fire in a building to prevent fire in a building or to prevent the spread of fire.

The first previous art is "Automatic fire monitoring and suppression system for buildings" (Korean Patent No. 10-1204008, the prior art 1).

The prior art 1 relates to a fire detection unit installed separately for each floor and room in a building to detect the occurrence of a fire; a nozzle unit provided for each floor and room of a building, and for spraying a fire extinguishing medium when the control unit determines that a fire has occurred; a fire extinguishing medium discharge unit having a housing communicating with the nozzle unit and filled with a fire extinguishing medium under a certain pressure, a valve selectively opening and closing the housing and the nozzle unit, and an actuator for driving the valve; a location information acquisition unit that is provided to each manager of the building and obtains location information of a manager terminal that can transmit/receive location information; a transmitting/receiving unit for transmitting/receiving mutual location information and management information with the manager terminal; and a control unit that receives the signal from the fire detection unit to determine whether a fire has occurred, and if it is determined that there is a fire, the actuator is driven to eject the fire extinguishing medium to control the automatic fire extinguishing operation, and the manager located at the shortest distance from the fire site that tracks the terminal through the location information acquisition unit and transmits a fire alarm signal through the transmitter/receiver unit.

The prior art 2 is "Wired/Wireless Disaster Automatic Monitoring System (Korean Patent No. 10-0704018, the prior art 2)."

The prior art 2 relates to a wireless automatic disaster monitoring system, and in particular, a low-power wireless disaster detection sensor and a wired/wireless mixed repeater are to communicate with the disaster monitoring main device to monitor disaster information, and in the event of a disaster such as a fire, when it is impossible to predict the course of a fire in an assembly building where a fire is in progress due to the loss of a wired line that transmits information to the outside, an emergency wireless disaster monitoring device is installed and wirelessly communicates directly with the repeater installed in the building, enabling efficient and scientific disaster suppression and rescue activities by grasping the information of the wireless disaster detection sensor that has not been lost and identifying the route of disasters such as fire.

The third prior art is "Multi-monitoring control device in building through OLED touch screen type programmable switch (Korean Patent No. 10-1252795, the prior art 3)."

According to the prior art 3, when a conventional programmable switch controls the connection of a logic block and an interconnect wire or controls the connection of two different wires, it must be connected by wire, so the circuit is complicated and installation time is required, which is a problem with this taking a long time. Because it only serves as a simple switch that turns on/off only certain devices (ex., lighting devices) in the office in the building, it is difficult to sense the environmental data (humidity, temperature, oxygen, brightness) of the office space, and there is also a problem that communication is not possible and a separate communication module must be installed during remote control. In order to improve these problems, as it consists of a smart programmable switch module, infrared sensor module, fire detection sensor module, and building central control server, circuits and wiring can be shortened by 70% compared to the existing ones through the CAN wired communication module and the relay module installed on the ceiling. It is possible to change the number and control method of lighting switches by updating on the program without the need for a plurality of lighting switch operation units according to the number of lighting equipment, thereby reducing the cost of lighting switch development and production. It can provide environmental data on oxygen, humidity, and temperature of the office space in the building, and can transmit the lighting usage status of the office space to the building central control server in real time. It is equipped with a self-scheduling function to set the power consumption to a minimum. In the event of an emergency (fire), it can inform the location of the door for the evacuation route of the installation space and can perform a crime prevention function. Above all, through the OLED touch screen part, frame-type lighting graphics and animated video landscape graphics are normally displayed, but when touched, it can be changed to display switched graphics, making the office space more comfortable by compatibility with the design and wallpaper of the office space. The purpose is to provide a multi-monitoring control device in a building through an OLED touch screen type programmable switch.

The fourth prior art is "Control method of automatic control system for building with fire monitoring function (Korean Patent No. 10-1113418, the prior art 4)."

According to the prior art 4, the system is a form in which the fire monitoring structure is included in the automatic control system for existing buildings comprising a flame detection sensor (SYCFDT) that detects and transmits flames installed in the indoor space of buildings where there is a risk of fire, a remote control panel (SYD-1000) that receives the flame detected from the flame detection sensor by wire and notifies the occurrence of a fire, and a central monitoring panel (SYCBAS-6000) that receives the flame generation signal transmitted from the remote control panel (SYD-1000) through communication and enables the person in charge and the person in charge to recognize the fire signal. When fire monitoring is carried out, the central monitoring panel monitor notifies the location of the fire, and when a fire occurs from the central monitoring panel speaker, an alarm sound is continuously generated and when a fire is extinguished, the camera should not be activated automatically.

In the case of the prior arts as mentioned above, although technical attempts have been made to monitor, detect, and monitor fire in a building, there is a problem in that a separate sensor location for monitoring fire needs to be allocated.

In addition, in the case of the prior arts, there is a problem in that it is not conceptually partitioned for each desired zone, so there is a problem in that it is difficult to immediately monitor a spreading path of fire between partitioned zones and a fire source accordingly.

In addition, the prior arts detect a fire through a specific location in a space, for example, a single sensor attached to the ceiling, so a spreading path of fire cannot be grasped, and it is detected only after fire has progressed to some extent in one space. Because of this, there is also a fundamental problem that rapid fire suppression cannot be achieved in the space where the fire is detected.

SUMMARY OF THE INVENTION

According to the present invention, building monitoring system for sensing fire on every fire compartment in real time by using sensor attached to edge of hole of fire wall was devised to solve the conventional problems as described above, and presents tasks as follows.

First, it is to construct real-time detection of fires in buildings.

Second, it is to detect an occurrence of fire in real time for each fire compartment.

The object of the present invention is not limited to those features mentioned above, and other problems not mentioned will be clearly understood by those skilled in the art from the following description.

According to the present invention, building monitoring system for sensing fire on every fire compartment in real time by using sensor attached to edge of hole of fire wall has the following problem solving means for the above-mentioned problems.

According to the present invention, building monitoring system for sensing fire on every fire compartment in real time by using sensor attached to edge of hole of fire wall comprises a fire-resistant sealing unit installed adjacent to a penetration part penetrating a partition wall inside a building, and filling the penetration part with fire-resistant sealing by heat generated in case of a fire in the building; a fire sensing unit installed adjacent to a fire-resistant sealing unit to detect whether a fire has occurred in a compartment area; and a control server that divides the inside of the building into predetermined conceptualized compartments, manages them as conceptualized compartmental areas, detects fire occurrence information from a fire sensing unit for each compartmental area, and calculates fire vector information.

According to the present invention, the fire-resistant sealing unit is provided to surround an outer circumferential surface of a penetration pipe passing through one surface and the other surface of a partition wall, and seals to fill the inside of a penetration pipe melted by fire heat generated during a fire.

According to the present invention, the fire-resistant sealing unit comprises an outer ring part placed to be spaced apart from an outer circumferential surface of a penetration pipe to surround an outer circumferential surface; and a fire-resistant filling part disposed between an inner circumferential surface of an outer ring part and an outer circumferential surface of a penetration pipe and expanded inwardly by fire heat for fire-resistantly sealing the inside of the molten penetration pipe.

According to the present invention, the outer ring part resists an outward expansion force of a fire-resistant filling part making the fire-resistant filling part expand inwardly.

According to the present invention, the fire sensing unit comprises a housing part forming an outer body of the fire sensing unit and introducing fire gas generated during a fire through a gas penetrating part provided in the outer body; a light-emitting plate part provided in the housing part and emitting light through applied electric power; and a photoelectric plate unit disposed to face the light emitting plate unit and receiving light emitted from the light-emitting plate unit.

According to the present invention, the photoelectric plate unit generates a change in current through a change in the amount of light received due to the fire gas flowing into the housing unit.

According to the present invention, the fire sensing unit comprises a housing part forming an outer body of the fire sensing unit and introducing a fire gas generated during a fire through a gas penetrating part provided in the outer body; an ionizing unit provided in the housing unit and generating ions through applied electric power; and a conduction part disposed apart from the ionizing part to receive ions generated from the ionizing part to generate a current flow from the ionizing part.

According to the present invention, the conduction part generates a change in current through a change in the amount of light received due to the fire gas flowing into the housing unit.

According to the present invention, the control server detects fire occurrence information from the fire sensing unit arranged for each compartment area, detects the direction and speed of a fire spreading from one compartment area to another compartment area, and calculates the fire vector.

According to the present invention, the control server detects fire occurrence information and the fire vector information for each compartment area, and transmit it to an external server.

According to the present invention as described above, building monitoring system for sensing fire on every fire compartment in real time by using sensor attached to edge of hole of fire wall provides effects as follows.

First, adjacent sensors in the filling of a fire-resistant wall dividing a fire compartment detect fire in real time.

Second, according to fire detection for each fire compartment area, the speed at which the fire spreads in the building and a spreading path are grasped in real time.

Third, it is possible to monitor the direction and amount of the spread of fire.

Fourth, it provides information that can respond according to the source of the fire, and the speed and the extent of its spread.

Effects of the present invention are not limited to those mentioned above, and other effects not mentioned will be clearly understood by those skilled in the art from the following description.

DETAILED DESCRIPTION OF THE INVENTION

According to the present invention, individual real-time fire sensing monitoring system for fire compartments in building using rechargeable sensor around a penetration part can have various alterations and embodiments, and specific embodiments are shown in diagrams and demonstrated in detail. However, the scope of the present disclosure should be not limited by specific embodiments and the present disclosure may be variously modified and altered with addition, change, deletion or supplement of elements by those skilled in the art to which the present disclosure pertains without departing from essential features of the present disclosure. This is also included in the scope of the present invention's spirit.

Figure 1:
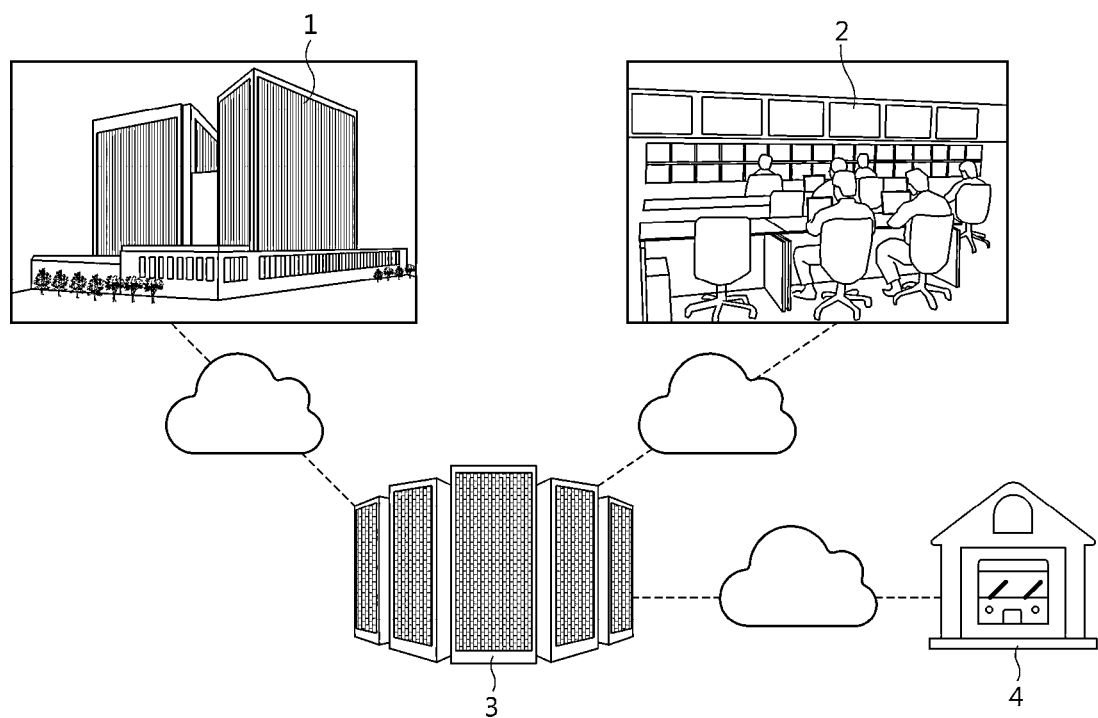
FIG. 1 is a conceptual diagram displaying fire detection and control in a compartment area using the present invention according to an embodiment of the present invention.
Figure 2:
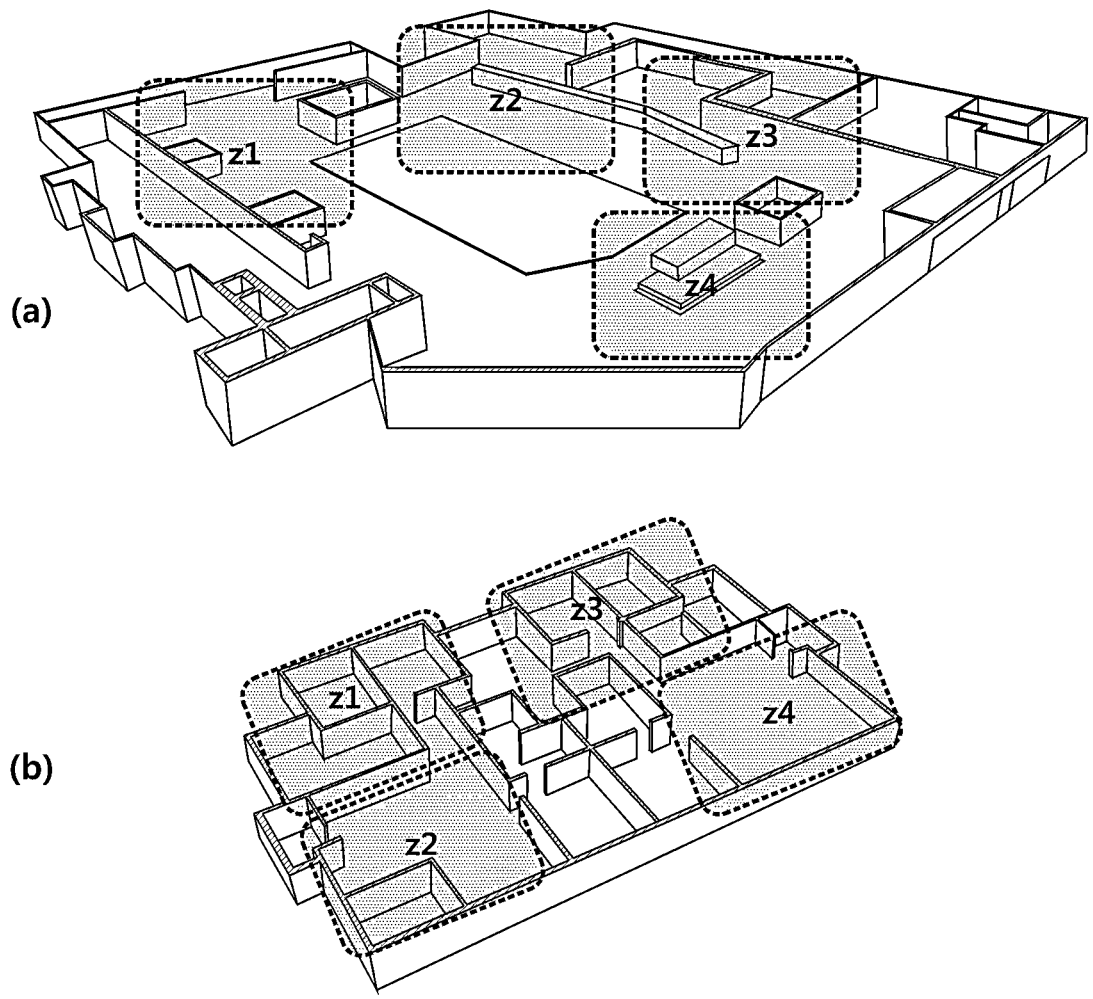
FIG. 2 is a conceptual diagram illustrating a compartment area in which the inside of a building is conceptually divided, of the present invention according to an embodiment of the present invention.
Figure 3:
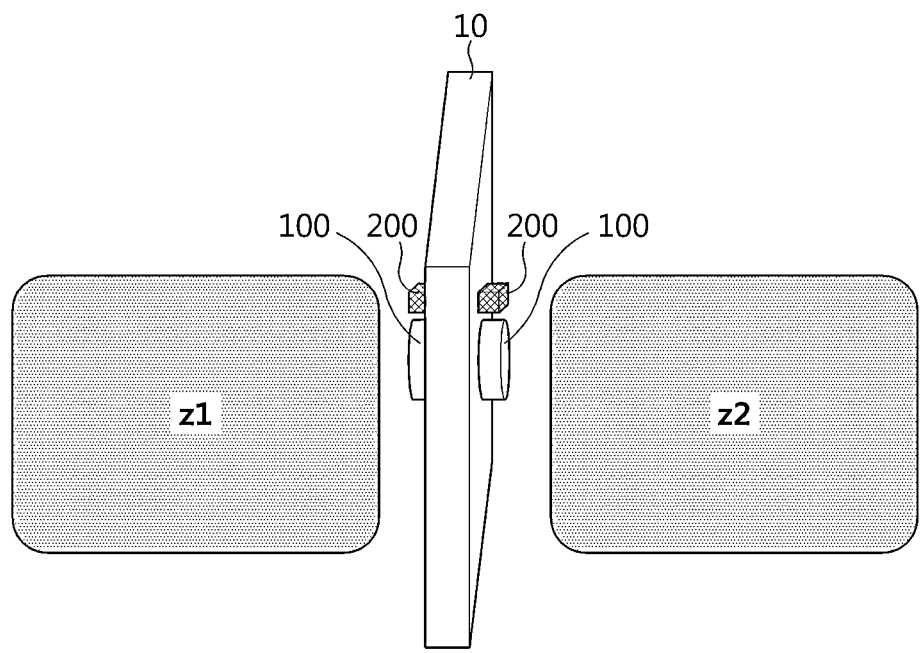
FIG. 3 is a side perspective view illustrating a fire sensing unit installed on a partition wall of the present invention according to an embodiment of the present invention.
Figure 4:
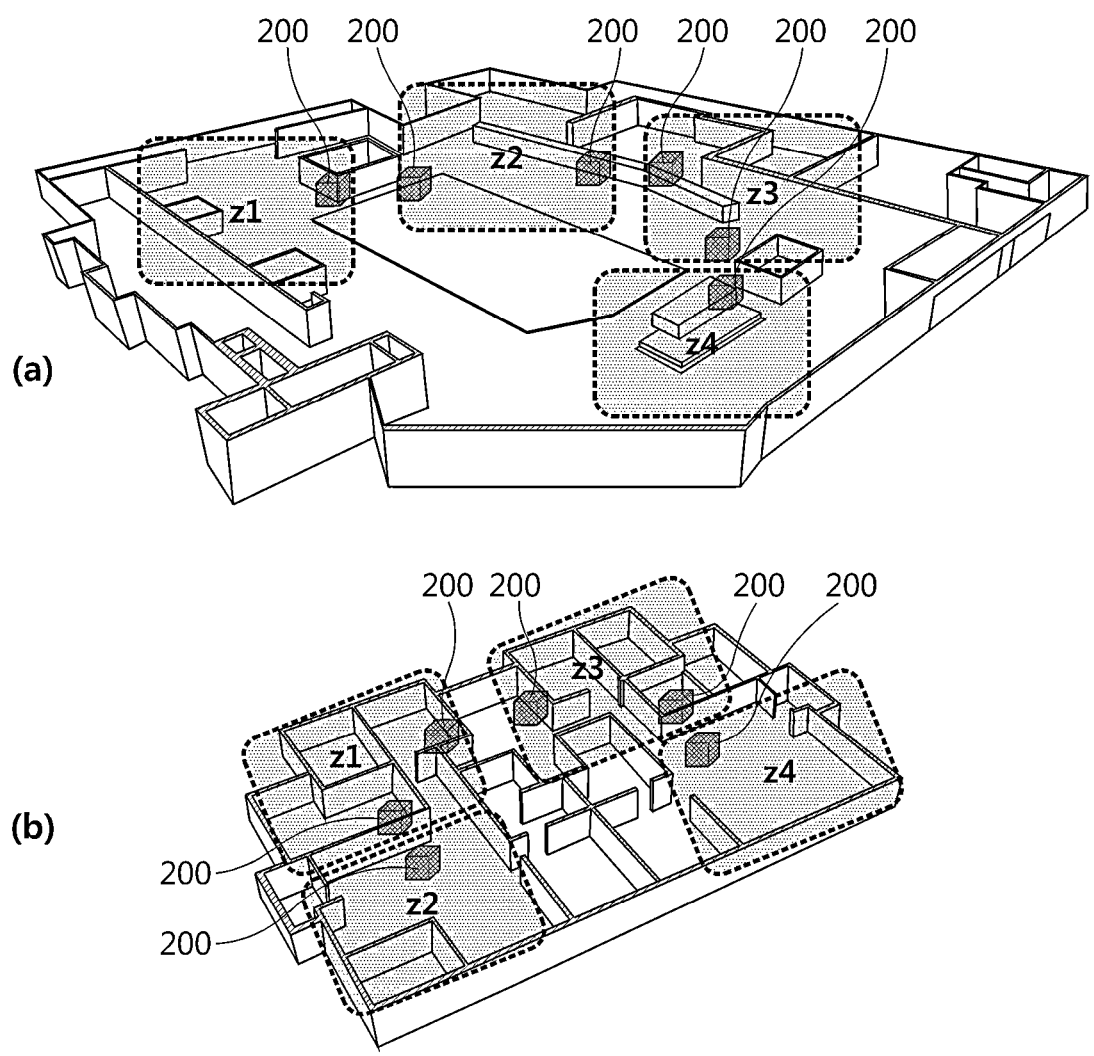
FIG. 4 is a conceptual diagram illustrating a fire sensing unit installed on each compartment area by the present invention according to an embodiment of the present invention.
Figure 5:
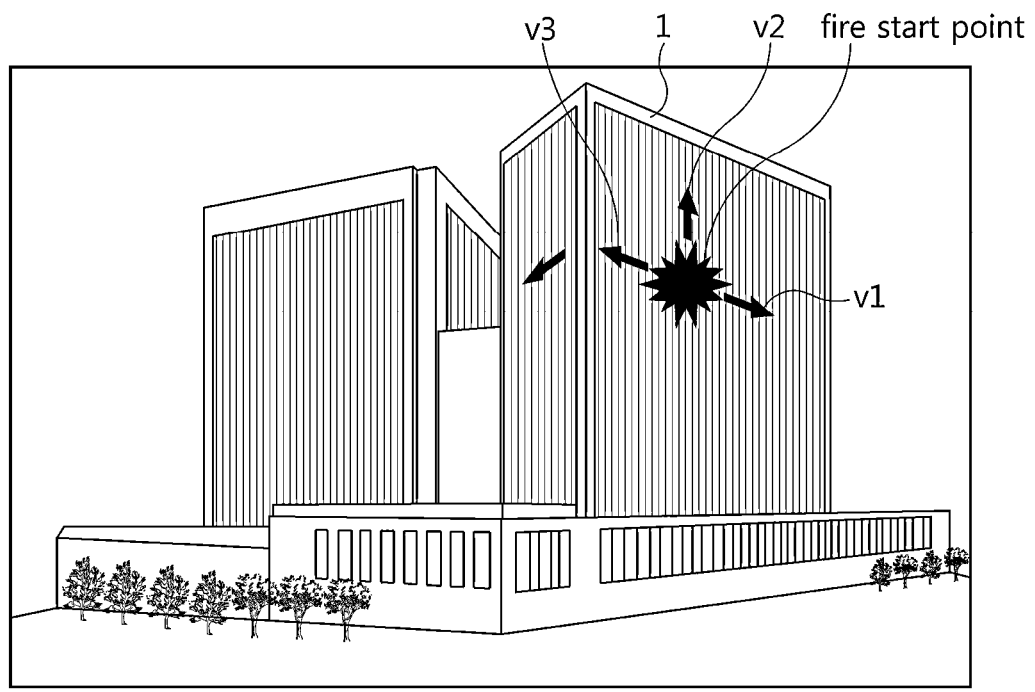
FIG. 5 is a conceptual diagram illustrating fire detection by applying a fire vector to each compartment area inside a building by the present invention according to an embodiment of the present invention.
Figure 6:
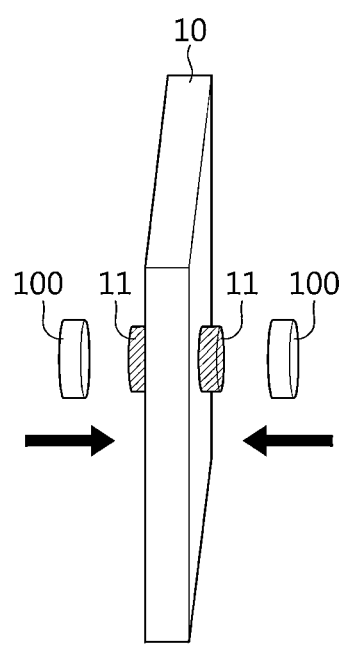
FIG. 6 is an exploded perspective view showing a fire-resistant sealing unit installed, of the present invention according to an embodiment of the present invention.
Figure 7:
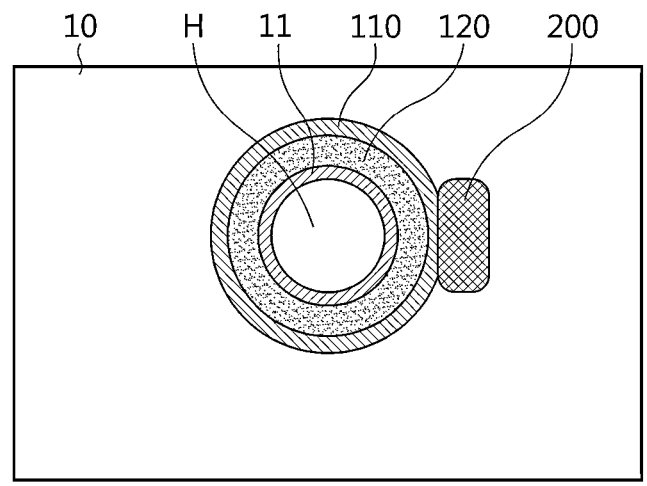
FIG. 7 is a front view illustrating a fire-resistant sealing unit and a fire sensing unit installed on a partition wall, of the present invention according to an embodiment of the present invention.
Figure 8:
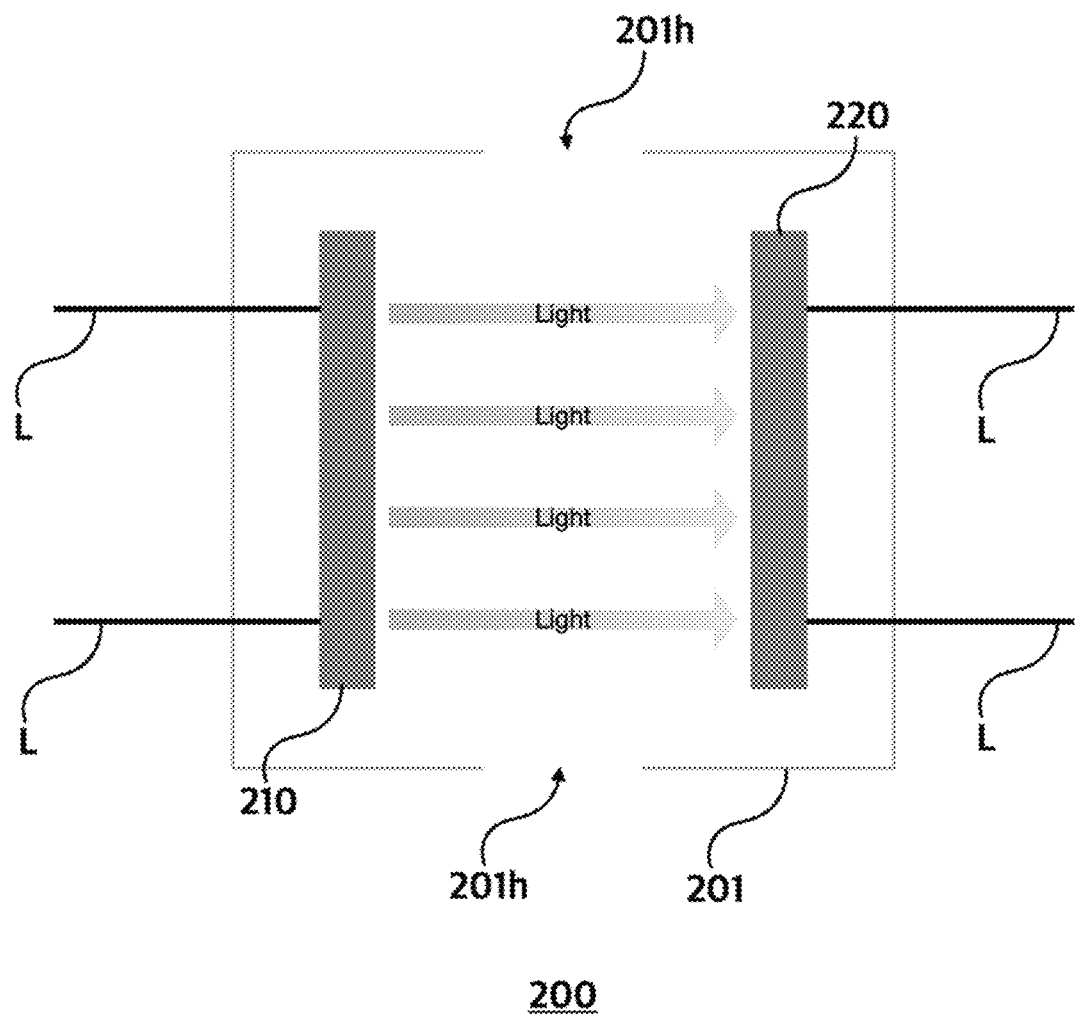
FIGS. 8 and 9 are exploded views of a fire sensing unit of the present invention according to an embodiment of the present invention.
Figure 9:
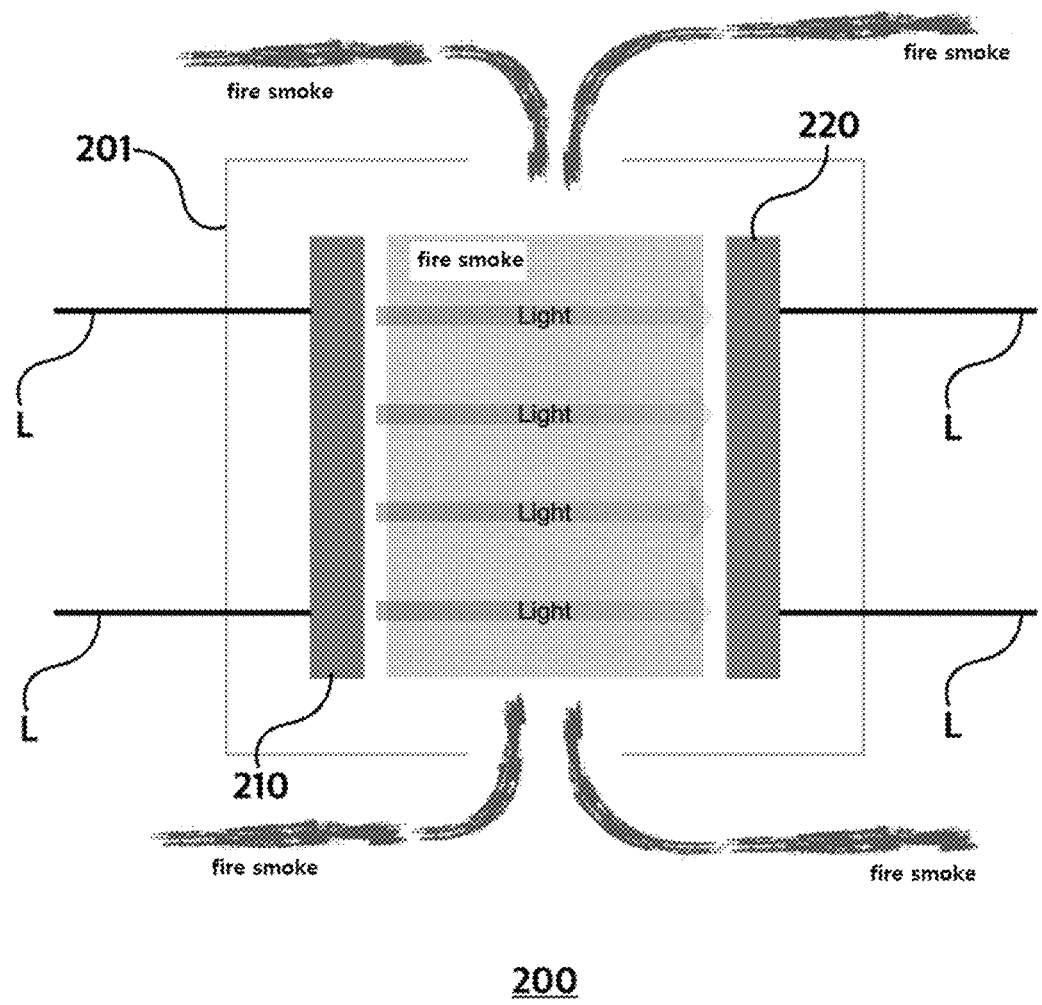
Figure 10:
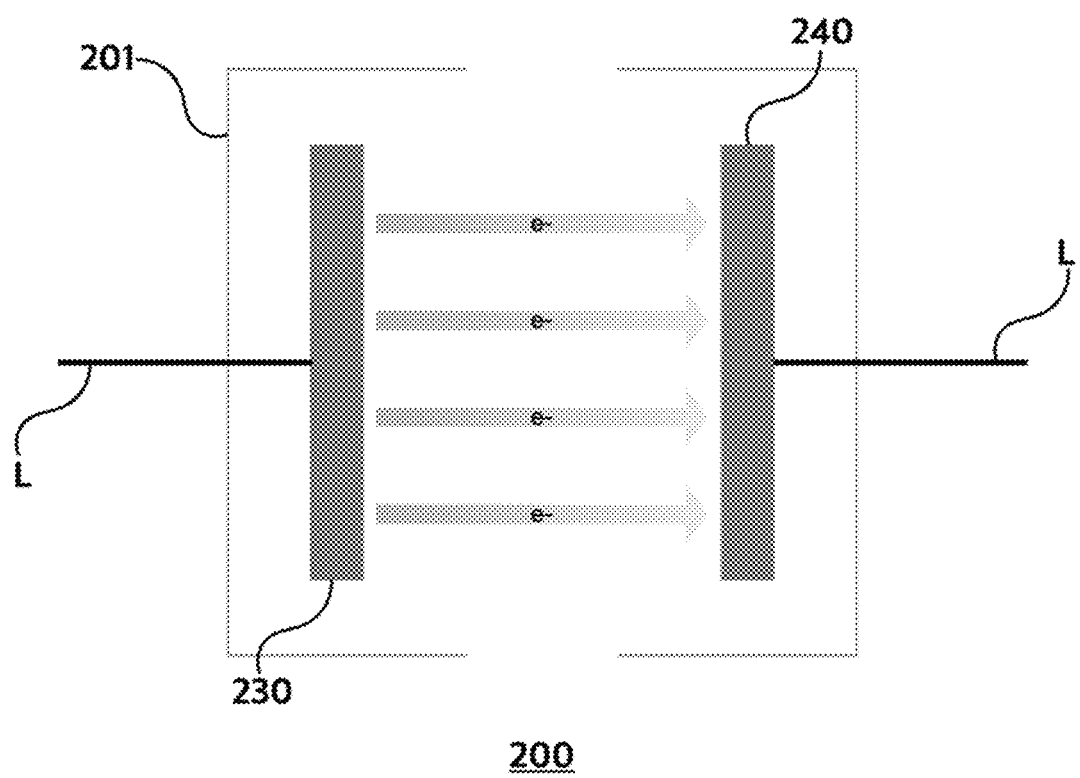
FIGS. 10 and 11 are the second exploded views of a fire sensing unit of the present invention according to an embodiment of the present invention.
Figure 11:
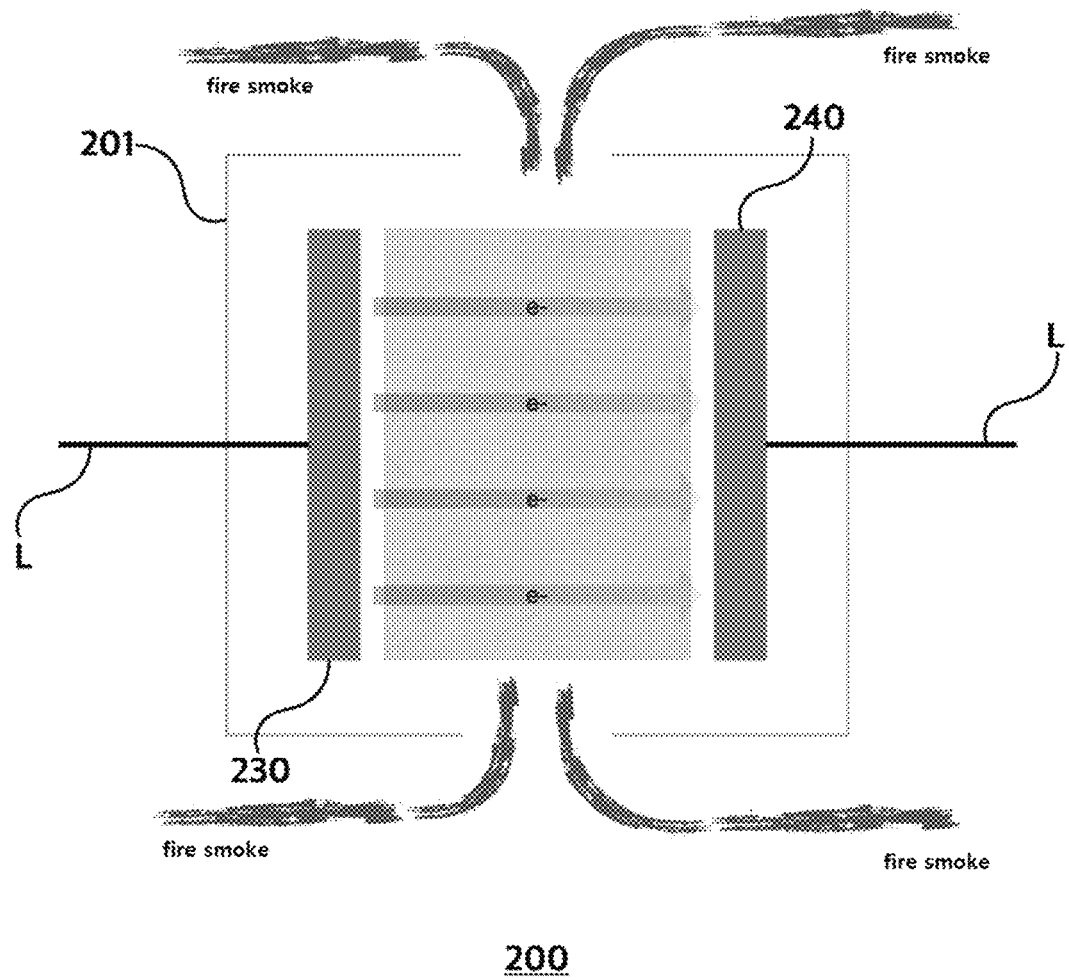

FIG. 1 is a conceptual diagram displaying fire detection and control in a compartment area using the present invention according to an embodiment of the present invention. FIG. 2 is a conceptual diagram illustrating a compartment area in which the inside of a building is conceptually divided, of the present invention according to an embodiment of the present invention. FIG. 3 is a side perspective view illustrating a fire sensing unit installed on a partition wall of the present invention according to an embodiment of the present invention. FIG. 4 is a conceptual diagram illustrating a fire sensing unit installed on each compartment area by the present invention according to an embodiment of the present invention. FIG. 5 is a conceptual diagram illustrating fire detection by applying a fire vector to each compartment area inside a building by the present invention according to an embodiment of the present invention. FIG. 6 is an exploded perspective view showing a fire-resistant sealing unit installed, of the present invention according to an embodiment of the present invention. FIG. 7 is a front view illustrating a fire-resistant sealing unit and a fire sensing unit installed on a partition wall, of the present invention according to an embodiment of the present invention. FIGS. 8 and 9 are exploded views of a fire sensing unit of the present invention according to an embodiment of the present invention. FIGS. 10 and 11 are the second exploded views of a fire sensing unit of the present invention according to an embodiment of the present invention.

According to of the present invention, as shown in FIG. 1, individual real-time fire sensing monitoring system for fire compartments in building using rechargeable sensor around a penetration part monitors the size and spread rate of fire by compartment area as well as the origin of fire in a building in real time on the basis of profiling about whether fire occurs in a building.

The existing fire detection sensors installed on a ceiling of a living room, a room or an office in a building 1 only detect fire in a certain space sensing gas from fire. According to the existing skills, it seems to be advanced that an outbreak of fire alarms a central control system and fire information is automatically or semiautomatically transmitted to external agencies such as a fire station, but there has been a problem that installations in building makes limit in space and it is hard to detect a fire flow in one space.

According to the present invention, in order to solve the existing problems mentioned above, the inside of a building 1 is divided into designated conceptualized areas, which is divided into compartment areas(Zn).

The compartment area(Zn) is not the same as simply a concept of a room or a wall inside a room in a building 1.

As shown in FIG. 2, a compartment area(Zn) can be set up for one conceptualized compartment combining several rooms and one room can be divided into conceptualized compartments.

A compartment area(Zn) is divided by a partition wall 10 as described below, which does not have to be a bearing wall, but which should function as a firewall.

For this purpose, the present invention comprises a fire resistant sealing unit 100, a fire sensing unit 200 and a control server 2.

As shown FIG. 3, the fire resistant sealing unit 100 locates near a penetration part penetrating the partition wall 10 inside a building 1. More specifically, as shown in FIG. 6, the penetration pipe 11 penetrates the penetration part of the partition wall 10 and the fire-resistant sealing unit 100 is installed near respectively one side and the other side, covering the outer circumferential surface of a penetration pipe 11.

It is safe that a penetration pipe 11 without fire resistant is melted and burnt down by heat from fire.

If the penetration pipe 11 is melted by heat from fire, an inner part of the penetration pipe 11 is exposed causing a penetration part of the partition wall 10 to be exposed as it is.

The fire-resistant sealing unit 100 covering an outer circumferential surface of the penetration pipe 11 seals and fills an inner part of the penetration pipe 11 or the penetration part expanded and melted by heat from fire.

Because the fire resistant sealing unit 100 expanded by heat from fire is composed of heat-resistant materials from fire, expands toward an inner circumferential surface and seals a penetration part of the partition wall 10, it functions not to spread a gas from a side of the partition wall 10 to another side by the partition wall 10.

It is desirable that the fire resistant sealing unit 100 should meet the present standards of Notice of Ministry of Land, Infrastructure and Transport 2016-416.

According to the present invention, as shown in FIG. 3, the fire sensing unit 200 detects an outbreak of fire in compartment areas(Zn) locating near the fire resistant sealing unit 100.

As shown in FIG. 3, the fire sensing unit 200 is placed at both sides in pairs of a partition wall 10 near the fire resistant sealing unit 100, firstly senses an outbreak of fire in compartment areas(Zn) and at the same time the fire resistant sealing unit 100 proceeds to seal from hear of fire.

For example, fire gas at Z1 of FIG. 4 can spread to adjacent Z2 and the gas spreads through a penetration part of a partition wall dividing Z1 and Z2. Therefore, a fire sensing unit 200 first senses adjacent areas of Z1 at Z2 compartment area after it detects the fire from Z1 at Z1. The fire sensing unit 200 placed near at both sides of a penetration part of the partition wall 10 by compartment area detects spreading from which compartment area to which compartment area and spreading speed and path of fire according to action of the fire resistant sealing unit 100 as shown in FIG. 5.

Therefore, the control server 2 can be placed inside or outside of a building 1.

As described above, the control server 2 divides the inside of a building 1 into designated conceptualized areas, corresponding to compartment area(Zn) as said above.

The control server 2 continuously detects fire occurrence information of the fire sensing unit 200 arranged for compartment area in real time, but as shown in FIG. 5, depending on the mechanism of the fire resistant sealing unit 100 of the penetrating part dividing the partition wall 10, it can definitely detect how much the fire spreads. That is, for example, after only a portion of the gas is generated from one compartment area and spread to the other compartment area if a supply of the gas is cut off due to mechanism of the fire-resistant sealing unit 100, the fire detection in the other compartment, that is, gas detection is stopped, only a certain degree of spreading of the gas is recognized, and it can be recognized that spreading has not occurred until the actual fire.

The control server 2 estimates fire occurrence information of a fire sensing unit 200 through continuous fire gas detection. It can check whether a fire gas blocking of the fire resistant sealing unit 100 stops spreading after only a fire gas is partially spread in a specific compartment area, or whether mechanism of the fire-resistant sealing unit 100 is insufficient, or mechanism of the fire resistant sealing unit 100 alone is insufficient to prevent the spread of fire after fire gas is spread.

The control server 2 estimates fire vector information. As described above, the fire vector information includes direction and speed at which the fire spread from one compartment area Z1 to the other division area Z2, and a fact about whether or not the fire actually occurred.

According to the present invention, as shown in FIGS. 6 and 7, a fire-resistant sealing unit 100 comprises the outer ring part 110 and the fire-resistant filling part 120.

As shown in FIG. 7, the outer ring part 110 is placed apart to surround an outer circumferential surface from an outer circumferential surface of the penetration pipe 11.

The outer ring part 110 is made of a circular band or chain, or an assembly of several hinge-connected structures, and the inner circumferential surface described below comprises the fire-resistant filling part 120.

The fire-resistant filling part 120 is placed at between an inner circumferential surface of the outer ring part 110 and an outer circumferential surface of the penetration pipe 11, and inside of the penetration pipe 11 inwardly expanded and melted by heat of fire, that is, one surface or the other surface of the penetration part is sealed with fire-resistant.

The outer ring part 110 having the fire-resistant filling part 120 on the inner circumferential surface resists an outward expansion force of the fire-resistant filling part 120 making the fire-resistant filling part 120 expand inwardly.

The fire sensing unit 200 comprises a housing part 201, a light-emitting plate part 210, and a photoelectric plate part 220.

As shown in FIG. 8, the housing part 201 forms an external body of the fire sensing unit 200, and gas generated from fire through a gas penetration part 201h provided in the external body is inpoured.

The light-emitting plate part 210 is provided in the housing part 201 and emits light through applied electric power.

The light-emitting plate part 210 transfers an energy of emitted light to the photoelectric plate part 220 as described below.

Thereafter, the photoelectric plate part 220 is placed to face the light-emitting plate part 210 and receives light emitted from the light emitting plate part 210.

As shown in FIG. 9, the photoelectric plate part 220 generates a change in current through a change in the amount of light received due to the fire gas flowing into the housing part 201, and through this, gas detection of fire is made. As a result, information about the occurrence of a fire is recognized.

The light emitting part 210 sequentially generates a lane of emitted light, and through this, each light reception level can be recognized differently depending on a power generation position of the photoelectric plate part 220 that receives and generates light. Through this, it is possible to sense concentration of fire gas and speed of spreading even within one fire sensing unit 200.

As shown in FIG. 10, as another embodiment of the fire sensing unit 200, the fire sensing unit 200 comprises a housing part 201, an ionizing part 230 and a conduction part 240.

As described above, the housing part 201 forms an external body of a fire sensing unit 200, and inpours fire gas generated during a fire through a gas penetration part 201h provided in the external body.

The ionizing part 230 is provided in the housing part 201 and generates ions through applied power.

Ions generated by the ionizing part 230 flow into the conduction part 240, and current flows through ions reaching the conduction part 240.

That is, the conduction part 240 is spaced apart from the ionizing part 230 receives ions generated from the ionizing part 230 to generate a current flow from the ionizing part 230.

As shown in FIG. 11, the conduction part 240 generates a change in current through a change in the amount of light received due to fire gas flowing into the housing part 201, thereby sensing information on the occurrence of fire.

As shown in FIG. 1, the control server 2 detects fire occurrence information and fire vector information for each compartment area, and transmits it to the external server 4, for example, a fire station, and through this, fire occurrence leads to a computational response.

The scope of the present disclosure should be determined by listed items, and the brackets of claims are listed not for optional limit but for clear elements, and contents of brackets should be understood as essential elements.

What is claimed is:

1. A building monitoring system comprises:
    a fire-resistant sealing unit installed adjacent to a penetration part penetrating a partition wall inside a building, and filling the penetration part with fire-resistant sealing by heat generated in case of a fire in the building;
    a fire sensing unit installed adjacent to the fire-resistant sealing unit to detect whether a fire has occurred in a compartment area; and
    a control server that divides an inside of the building into conceptualized compartment areas to manages the inside as the conceptualized compartment areas, detects fire occurrence information from the fire sensing unit for each of the conceptualized compartment areas, and calculates fire vector information.

2. The building monitoring system according to claim 1, wherein the fire-resistant sealing unit is provided to surround an outer circumferential surface of a penetration pipe passing through one surface and the other surface of the partition wall, and seals to fill the inside of the penetration pipe melted by fire heat generated during a fire.

3. The building monitoring system according to claim 2, wherein the fire-resistant sealing unit comprises:
    an outer ring part circling around the outer circumstantial surface of a penetration pipe; and
    a fire-resistant filling part disposed between an inner circumferential surface of the outer ring part and the outer circumferential surface of a penetration pipe and expanded inward by fire heat in order to fire-resistantly seal the inside of the molten penetration pipe.

4. The building monitoring system according to claim 3, wherein the outer ring part resists an outward expansion force of the fire-resistant filling part, leading the fire-resistant filling part to expand inwardly.

5. The building monitoring system according to claim 1, wherein the fire sensing unit comprises:
    a housing part forming an outer body of the fire sensing unit and introducing fire gas generated during a fire through a gas penetrating part provided in the outer body;
    a light-emitting plate part provided in the housing part and emitting light through applied electric power; and
    a photoelectric plate unit disposed to face the light emitting plate unit and receiving light emitted from the light-emitting plate part.

6. A The building monitoring system according to claim 5, wherein the photoelectric plate unit generates a change in current through a change in the amount of light received due to the fire gas flowing into the housing part.

7. A The building monitoring system according to claim 1, wherein the fire sensing unit comprises:
    a housing part forming an outer body of the fire sensing unit and introducing a fire gas generated during a fire through a gas penetrating part provided in the outer body;
    an ionizing part provided in the housing part and generating ions through applied electric power; and
    a conduction part disposed apart from the ionizing part to receive ions generated from the ionizing part to generate a current flow from the ionizing part.

8. The building monitoring system according to claim 7, wherein the conduction part generates a change in current through a change in the amount of light received due to the fire gas flowing into the housing part.

9. The building monitoring system according to claim 1, wherein the control server detects fire occurrence information from the fire sensing unit arranged for each of the conceptualized compartment areas, detects the direction and speed of a fire spreading from a first said conceptualized compartment area to a second said conceptualized compartment area, and calculates the fire vector information.

10. The building monitoring system according to claim 9, wherein the control server detects the fire occurrence information and the fire vector information for each of the conceptualized compartment areas, and transmits the fire occurrence information and the fire vector information to an external server.

* * * * *